United States Patent
Panasik et al.

[19]

[11] Patent Number: 5,987,547
[45] Date of Patent: Nov. 16, 1999

[54] NETWORK COMPUTER WITH INTERCHANGEABLE HARD DRIVE AND DATA TRANSCEIVER

[75] Inventors: Carl M. Panasik, Garland; Periagaram K. Rajasekaran, Richardson, both of Tex.

[73] Assignee: Texas Instruments Incorporated, Dallas, Tex.

[21] Appl. No.: 08/825,545

[22] Filed: Mar. 31, 1997

[51] Int. Cl.$^6$ .......................... G06F 13/38; G06F 15/17
[52] U.S. Cl. ............................ 710/102; 709/250
[58] Field of Search .................. 395/200.8, 281, 395/282, 283, 822; 361/684, 685, 686; 364/708.1; 709/250; 710/101, 102, 103

[56] References Cited

U.S. PATENT DOCUMENTS

| | | | |
|---|---|---|---|
| 5,265,238 | 11/1993 | Canova, Jr. et al. | 395/500 |
| 5,305,180 | 4/1994 | Mitchell et al. | 361/685 |
| 5,307,297 | 4/1994 | Iguchi et al. | 364/708.1 |
| 5,311,455 | 5/1994 | Ho | 364/708.1 |
| 5,373,149 | 12/1994 | Ramussen | 235/492 |
| 5,550,861 | 8/1996 | Chan et al. | 375/222 |
| 5,579,487 | 11/1996 | Meyerson et al. | 395/280 |
| 5,606,732 | 2/1997 | Vignone, Sr. | 455/269 |
| 5,608,606 | 3/1997 | Blaney | 361/686 |
| 5,612,927 | 3/1997 | Morrison et al. | 361/685 |
| 5,619,396 | 4/1997 | Gee et al. | 361/686 |
| 5,740,363 | 4/1998 | Siep et al. | 395/200.3 |
| 5,748,443 | 5/1998 | Flint et al. | 361/686 |
| 5,805,416 | 9/1998 | Friend et al. | 361/686 |
| 5,822,546 | 10/1998 | George | 395/281 |
| 5,822,547 | 10/1998 | Boesch et al. | 395/283 |
| 5,826,043 | 10/1998 | Smith et al. | 395/281 |

OTHER PUBLICATIONS

A. Bruce Carlson, Communication Systems: An Intorduction to Signals and Noise in Electrical Communication (3d ed.), pp. 325–327.

*Primary Examiner*—Mark H. Rinehart
*Attorney, Agent, or Firm*—Ronald O. Neerings; Richard L. Donaldson

[57] ABSTRACT

A network/portable computer (18) includes a modular bay (20) which can receive either a hard drive (22) or a data transceiver (24) for establishing a wireless network connection. When the network/portable computer (18) is in the local area covered by the network (10), the data transceiver (24) is installed to use the network (10) for storage and retrieval of data. When used in a remote area, where a network connection cannot be established, the hard drive (22) is installed in the modular bay (20) to provide a full featured computer.

18 Claims, 3 Drawing Sheets

NETWORK COMPUTER WITH INTERCHANGEABLE HARD DRIVE AND DATA TRANSCEIVER

CROSS-REFERENCE TO RELATED APPLICATIONS

U.S. Pat. No. 5,822,547, entitled "Method an Apparatus For Providing a Portable Computer With Hot Pluggable Modular Bays," to Boesch et al, filed May 31, 1996.

STATEMENT OF FEDERALLY SPONSORED RESEARCH OR DEVELOPMENT

Not Applicable

BACKGROUND OF THE INVENTION

1. Technical Field

This invention relates in general to computers and, more particularly, to a portable computer with enhanced capabilities for wireless networking.

2. Description of the Related Art

The personal computer revolutionized the manner in which business is conducted. Today, many workers are completely dependent upon their computer to perform their daily tasks. Many, if not most, businesses use computer networks to connect the various computers in the company.

Because of the large number of computers which may be used by a company, two facts are evident. First, a reduction in the price of a computer may greatly reduce costs for a corporation. Second, maintaining large number of computers can be very expensive, requiring a company to have one or more IS (information systems) personnel to configure, repair and upgrade computers.

One proposed solution to both problems is the network PC, commonly known as a NetPC. A NetPC differs from a normal personal computer in that it relies on the network server for most of its information. A NetPC may have no hard disk drive or have a small hard disk drive solely used as a virtual memory cache. All other information, including configuration files, applications and documents, is stored on the network server's hard drive.

The benefit of a NetPC is that the computer can be centrally administered by the IS department at the server location. The user is unable to change configurations or add programs, thereby reducing the introduction of conflicts within a system. A further advantage is that the individual NetPCs are less expensive than a normal personal computer, because they do not need a large hard drive for applications and documents.

For companies adopting the NetPC as a standard, the use of portable computers becomes problematic. One of the most important assets of a portable computer is its ability to operate in many different locations. Dependence on a wired network connection would severely limit the functionality of a portable computer.

One of the most important aspects of a portable computer is its size and weight, which in turn determine the ease with which the computer can be transported. Accordingly, manufacturers attempt to reduce the size of the components within a computer, without reducing the power of the computer. At some point, however, further reduction in size and weight is not possible without reduction in computer speed or capacity.

Therefore, a need has arisen for a portable computer which is lightweight and works efficiently within a network computer environment.

BRIEF SUMMARY OF THE INVENTION

The present invention provides a computer system comprising processing circuitry, a removable mass storage device, a removable wireless network interface and a modular bay for receiving either the mass storage device or the wireless network device.

The present invention provides significant advantages over the prior art. First, a lighter, more portable computer results from elimination of the portable hard drive while the computer is within reach of a local area network or a metropolitan network, while still allowing the computer to be fully functional when a network connection cannot be made. Second, while the wireless network is enabled, the computer uses less power. Third, the administration of the computer can be simplified for operations on the network.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–4 of the drawings, like numerals being used for like elements of the various drawings.

Figure 1:
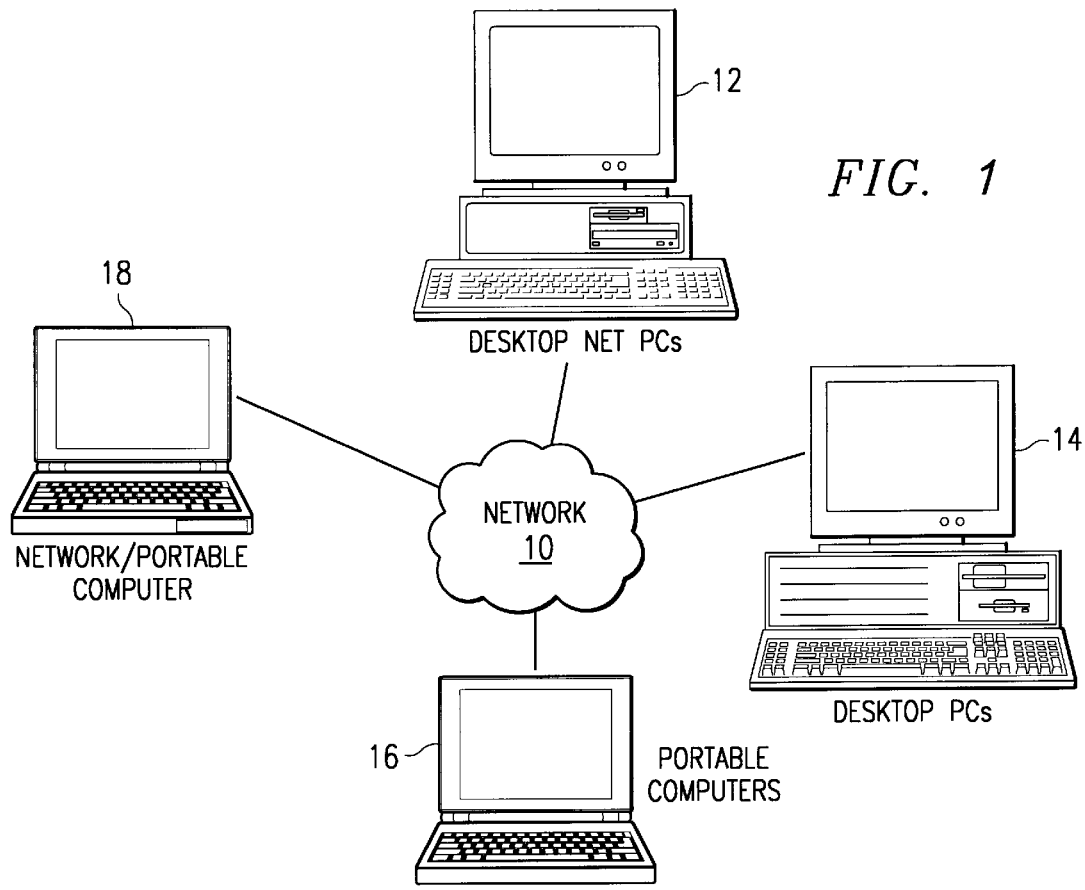
FIG. 1 illustrates a diagram of a computer network.

FIG. 1 illustrates an embodiment of a computer network 10 connected to a plurality of computers, including desktop NetPCs 12, desktop PCs 14, portable computers 16 and network/portable computers 18, described in greater detail hereinbelow. In a typical implementation, the computers coupled to the network could include all of the listed computers, or only a subset of the listed computers.

Desktop PCs 14 are normal computers which typically include a display, one or more mass storage devices (such as a hard disk, floppy drive, magneto-electronic drive, or other high density storage device), keyboard, processor and bus for adding additional peripheral devices. NetPCs 12 are similar to desktop PCs 14, but do not have the mass storage devices and have limited peripheral upgradability.

Portable computers 16 are also similar to desktop PCs, although the components are miniaturized where possible to conserve weight and size. For example, the display is generally a LCD (liquid crystal display) rather than a CRT (cathode ray tube). The hard drive in a portable computer is a smaller form factor. Generally speaking, the main chassis of the portable computer is not capable of holding as many mass storage devices as a desktop computer. Accordingly, manufacturers provide modular bays and PC Card slots (also referred to as PCMCIA slots) to allow the user to configure the computer with additional peripherals such as a second hard drive, a CD-ROM, network interface, modems and so on.

The network/portable computer 18 (described in greater detail in connection with FIGS. 2–4) may be configured without a hard drive, or similar read/write mass storage device, while the network/portable computer 18 is in a location covered by the network 10 and can be configured as a stand-alone computer (with hard drive) when the network/portable computer 18 is not within an area covered by the network 10.

When the network/portable computer 18 is within an area where a network connection can be established, the network/portable computer 18 uses the network as the source of applications and documents. Typically, to maintain the mobility of the network/portable computer 18, the network connection is made through a wireless network interface. In the office environment, computers on a wireless link typically communicate using RF (radio frequency) signaling, although a few systems use IR (infra-red) technology. For wider areas (e.g., metropolitan areas), cellular systems are used. Further, the network/portable computer 18 could have a hard wired connection to the network 10, for example, when it is being used in an office. The wired connection could be made either directly from internal network interface circuitry or through a docking station.

Figure 2:
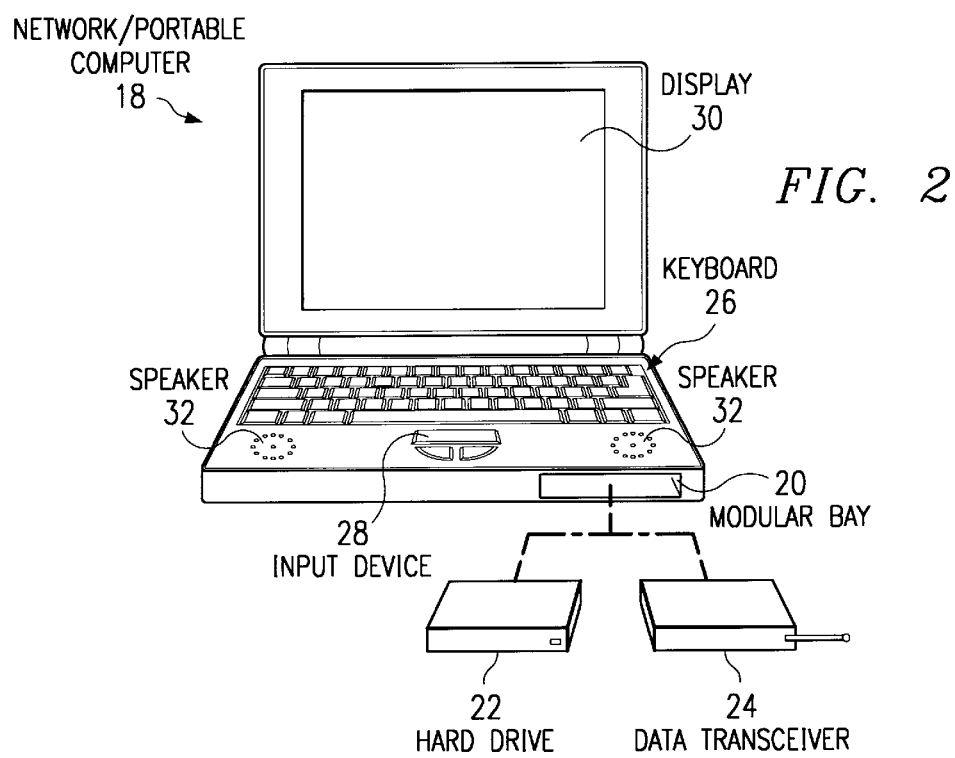
FIG. 2 illustrates a diagram of a network/portable computer used on the network of FIG. 1.

FIG. 2 illustrates a perspective view of a network/portable computer 18. The network/portable computer 18 is of normal configuration, with the exception that it does not have a permanent hard drive as do portable computers 16. Instead, an modular bay 20 is configured to receive either a hard drive 22, or similar mass storage and retrieval device, or a data transceiver 24. The modular bay is coupled to the internal processing circuitry (see FIG. 3) of the network/portable computer 18. The internal processing circuitry is also coupled to keyboard 26, input device 28, display 30, and speakers 32.

Mass storage device 22 can be any type of non-volatile mass storage device suitable for storing program and associated data files. Such devices would include such as a hard disk, magneto-electronic drive, writable CD-ROM, DVD (digital versatile disk), ZIP drive (manufactured by IOMEGA Corp.) or other high density storage device.

The data transceiver can be any type which will support communications with a wireless network. Typically, a 900 or 2400 MHz spread spectrum frequency modulation/demodulation technique is used; however, other modulation technologies and other frequency bands, including infra-red, could also be used.

In operation, when the network/portable computer 18 is in the network area, the data transceiver 24 is placed in the modular bay 20. In this mode, the network/portable computer 18 uses the network as its mass storage device, receiving all applications and associated files from the network 10. When the network/portable computer 18 is outside the area covered by the network 10 the hard drive can be used to store application and document files as needed.

The network/portable computer 18 provides many significant advantages. First, a much lighter and more mobile computer is obtained when the hard drive is not installed. Second, the hard drive is a significant power drain to the computer, which can be eliminated while the network/portable computer 18 is in the network area, allowing for greater battery life. Caching and virtual memory used by applications can be provided by semiconductor memory which is much lighter and more energy efficient. Third, the administration and maintenance of the network/portable computer 18 is enhanced while the network/portable computer 18 is used in its local (network) mode.

However, when the network/portable computer 18 cannot be connected to the network, replacing the data transceiver 24 with the hard drive 22 allows the network/portable computer 18 to operate as a full featured standalone computer for use off-site.

Figure 3:
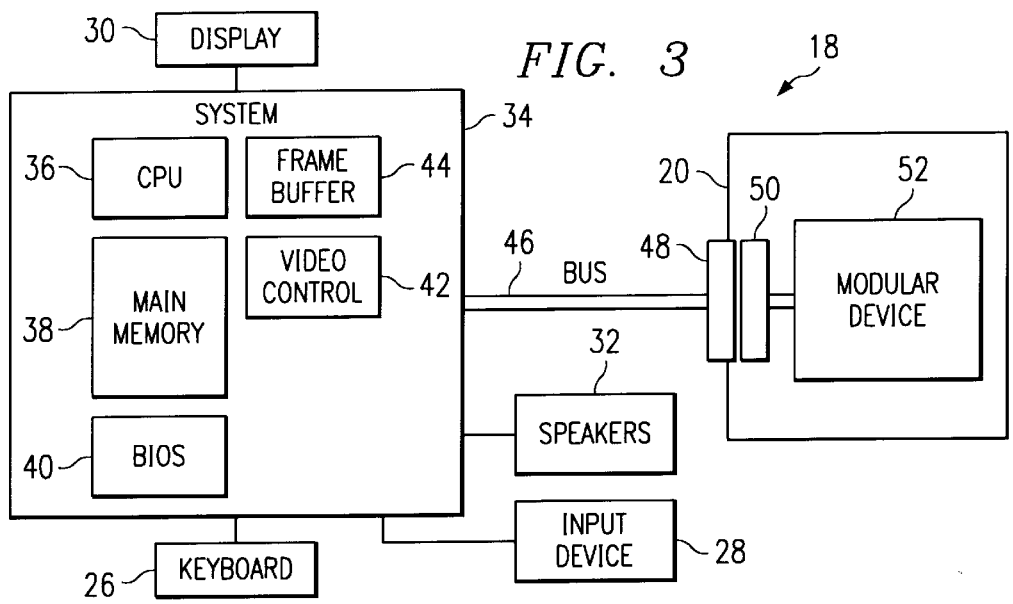
FIG. 3 illustrates a block diagram of the network/portable computer.

FIG. 3 illustrates a block diagram of the network/portable computer 18. Processing circuitry 34 includes, for example, CPU (central processing unit) 36, main (semiconductor) memory 38, BIOS (basic input output system) 40, video/graphics controller 42, and frame buffer 44. The processing circuitry is connected to keyboard 26, input device 28, speakers 32, and display 30. Further, the processing circuitry is coupled to modular bay 20 via bus 46. Modular bay 20 has a connector 48 which mates with a connector 50 associated with the modular device 52, which can be either the hard drive 22 or data transceiver 24, as described above. An example of a system which uses a modular bay for accepting various devices is described in detail in connection with U.S. Ser. App. No. 08/656,799, entitled "Method an Apparatus For Providing a Portable Computer With Hot Pluggable Modular Bays," to Boesch et al, filed May 31, 1996, which is incorporated by reference herein.

The specifics of the computer shown in FIG. 3 relate to an IBM compatible computer. Other computer architectures, such as APPLE MACINTOSH architectures could also be modified to support the present invention.

BIOS 40 is a non-volatile memory which supports many system level operations, including the boot sequence. Accordingly, it could store programs related to the switching of the modular device 52. Alternatively, another non-volatile memory could store routines to support the switching of devices.

Figure 4:
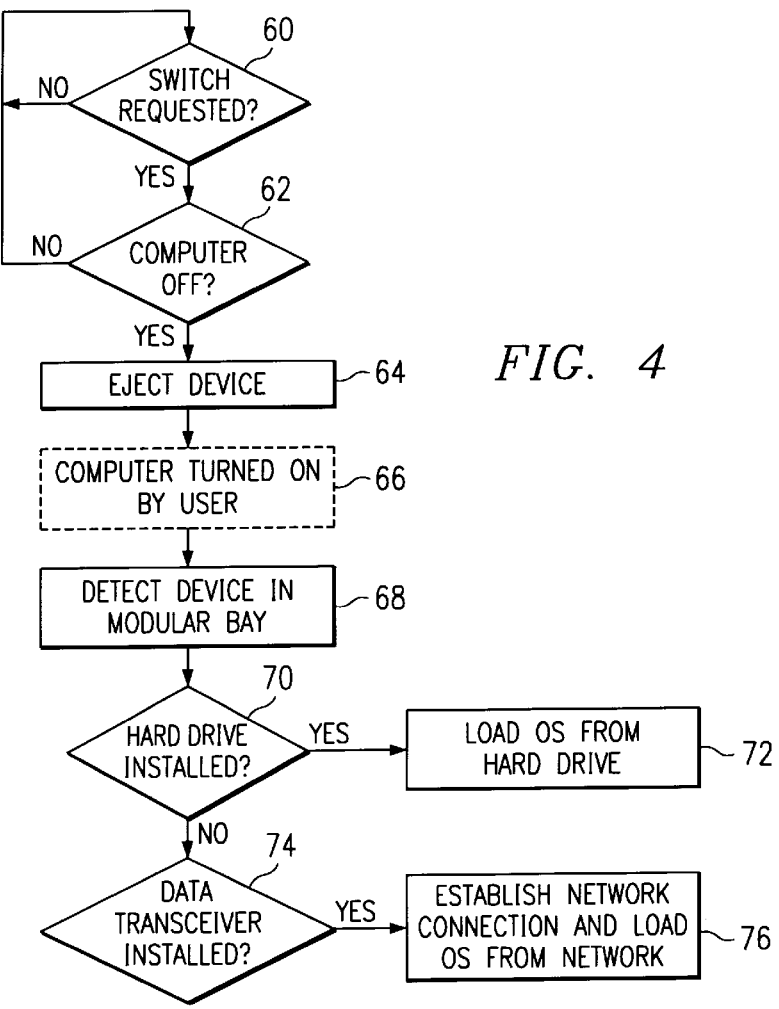
FIG. 4 illustrates a flow chart describing switching device modules in the network/portable computer.
Figure 5:
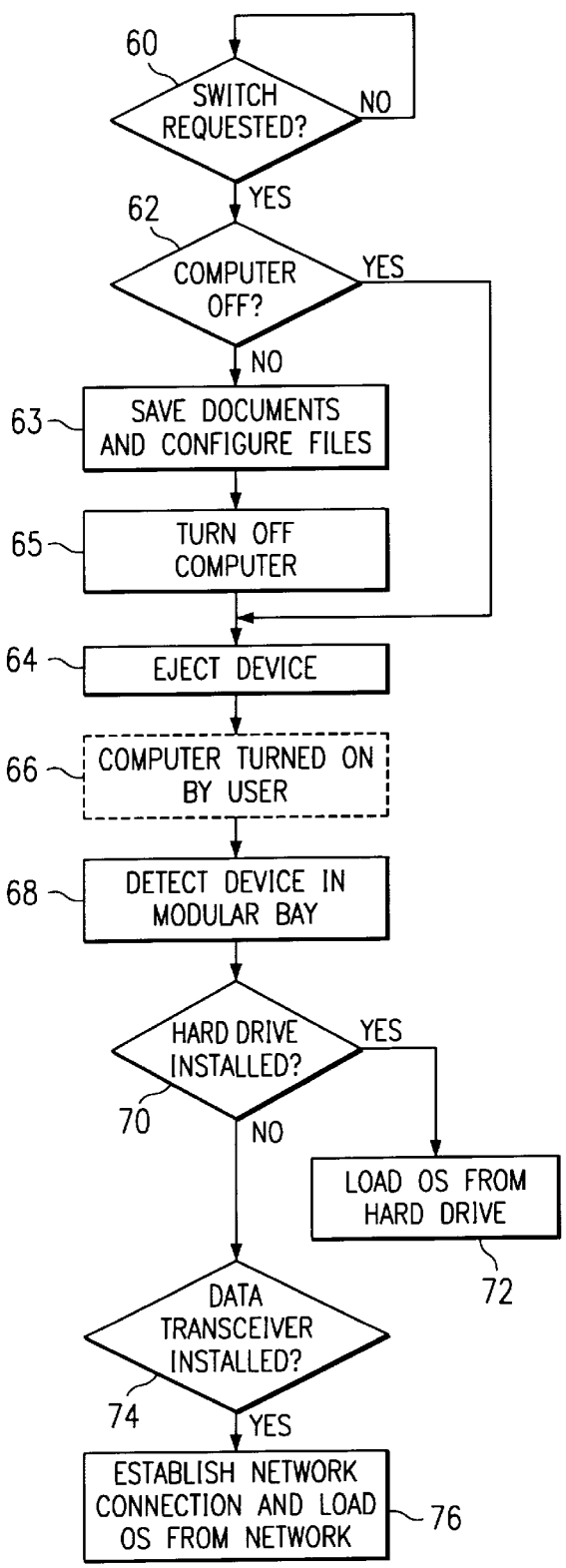
Figure 6:
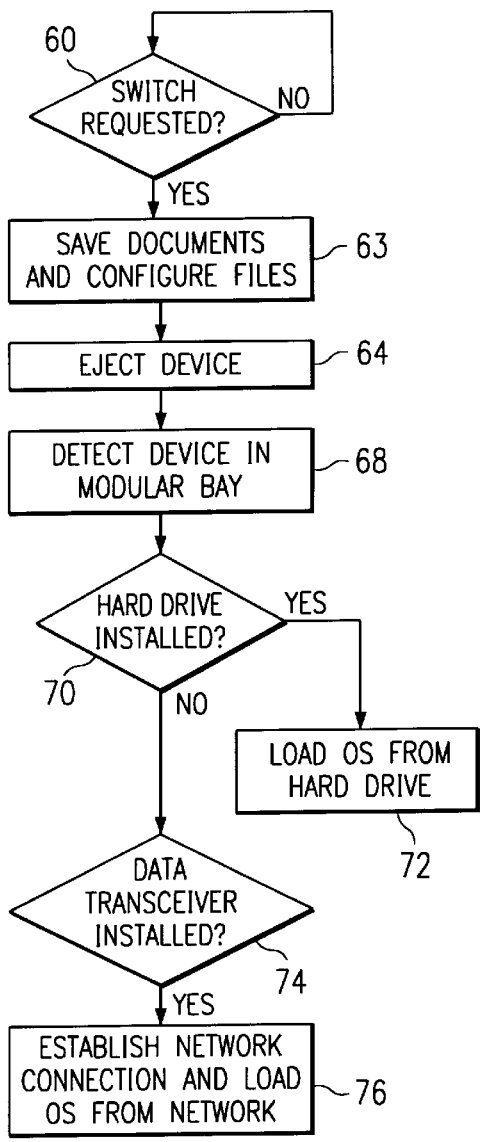

FIG. 4 illustrates a flow diagram describing operation of the switching routines. In the preferred embodiment, devices are switched only while the network/portable computer 18 is turned off. In block 60, a request to switch (for example, by pressing a button to eject the device in the modular bay 20) is detected. The request to switch is granted in block 64 if the power is turned off (power to the eject mechanism is enabled while the main power is off) in decision block 62. Preventing the switching of devices while the computer is powered reduces the complexity of the system, because open files will need to be properly closed prior to switching, either by writing the files to the hard drive 22 or writing the files to the network 10. Upon restarting the computer in block 66, the system checks to determine which device is in the modular bay 20 in block 68. If the hard drive 22 is in the modular bay 20 in block 70, the operating system is loaded from the hard drive in block 72. If the data transceiver 24 is in the modular bay 20 in decision block 74, the network is accessed to load the operating system in block 76.

The installation of the device 52 into the modular bay 20 could be made "hot swappable," i.e., while the computer is powered, although this would require a more complex scheme of saving all documents and configuration files prior to allowing the switch.

The present invention provides significant advantages over the prior art. First, a lighter, more functional, more portable computer results from elimination of the portable hard drive when the computer is within reach of a local area network or a metropolitan network. Second, while the wireless network is enabled, the computer uses less power. Third, the administration of the network/portable computer can be simplified for operations of the network/portable computer on the network.

Although the Detailed Description of the invention has been directed to certain exemplary embodiments, various modifications of these embodiments, as well as alternative embodiments, will be suggested to those skilled in the art. The network/portable computer has been described with regard to a particular implementation, although many of the details regarding the computers architecture could be changed without affecting the present invention. The invention encompasses any modifications or alternative embodiments that fall within the scope of the claims.

What is claimed is:

1. A computer comprising:

processing circuitry;

a removable non-volatile mass storage device, said removable non-volatile mass storage device being the sole mass storage device for said computer;

a removable wireless network interface; and a modular bay, having a port coupled to said processing circuitry, for receiving either said mass storage device or said wireless network device.

2. The computer of claim 1 wherein said removable mass non-volatile storage device comprises a hard drive.

3. The computer of claim 1 wherein said removable non-volatile mass storage device comprise a magneto-electronic storage device.

4. The computer of claim 1 wherein said removable non-volatile mass storage device comprises a DVD device.

5. The computer of claim 1 wherein said removable mass storage device comprises a writable CD-ROM.

6. The computer of claim 1 wherein said data transceiver comprises a radio frequency data transceiver.

7. The computer of claim 1 wherein said data transceiver comprises an infra-red frequency data transceiver.

8. The computer of claim 1 wherein said processing circuitry includes circuitry to control switching of said removable non-volatile mass storage device and said data transceiver.

9. A method of operating a computer in conjunction with a computer network, comprising the steps of:

while the computer is in an area where the computer network can be accessed through wireless communications, accessing program and data files from the computer network using wireless data transmission through a wireless network interface removably connected to a port coupled to processing circuitry for the computer; and while the computer is outside the area where the computer network can be accessed through wireless communications, removing said wireless network interface and adding a removable non-volatile mass storage device which is the sole mass storage device for said computer, and thereafter accessing program and data files.

10. The method of claim 9 and further comprising the step of removing said data transceiver from said port and connecting said mass storage device to said port when the computer's venue of operation will switch from the area in which the network can be accessed through wireless transmissions to an area outside of which the network can be accessed through wireless transmissions.

11. The method of claim 10 and further comprising the step of removing said mass storage device from said port and connecting said data transceiver to said port when the computer's venue of operation will switch from the area outside of which the network can be accessed through wireless transmissions to an area in which the network can be accessed through wireless transmissions.

12. The method of claim 11 wherein said step of accessing program and data files from the mass storage device comprises the step of accessing program and data files from a hard drive.

13. The method of claim 11 wherein said step of accessing program and data files from the mass storage device comprises the step of accessing program and data files from a magneto-electronic storage device.

14. The method of claim 11 wherein said step of accessing program and data files from the mass storage device comprises the step of accessing program and data files from a writable CD-ROM.

15. The method of claim 11 wherein said step of accessing program and data files from the mass storage device comprises the step of accessing program and data files from a DVD drive.

16. The method of claim 11 wherein said step of accessing program and data files from the data transceiver comprises the step of accessing program and data files from a radio frequency data transceiver.

17. The method of claim 16 wherein said step of accessing program and data files from the data transceiver comprises the step of accessing program and data files from a spread spectrum data transceiver.

18. The method of claim 11 wherein said step of accessing program and data files from the data transceiver comprises the step of accessing program and data files from an infra-red data transceiver.

* * * * *